United States Patent
Pison

(10) Patent No.: US 9,474,036 B2
(45) Date of Patent: Oct. 18, 2016

(54) METHOD FOR ATTACHING A USER TERMINAL TO A PACKET NETWORK

(75) Inventor: Laurent Pison, Jouars Ponchartrain (FR)

(73) Assignee: CASSIDIAN SAS, Elancourt (FR)

( * ) Notice: Subject to any disclaimer, the term of this patent is extended or adjusted under 35 U.S.C. 154(b) by 87 days.

(21) Appl. No.: 13/980,733

(22) PCT Filed: Oct. 21, 2011

(86) PCT No.: PCT/EP2011/068483
§ 371 (c)(1),
(2), (4) Date: Jul. 19, 2013

(87) PCT Pub. No.: WO2012/097886
PCT Pub. Date: Jul. 26, 2012

(65) Prior Publication Data
US 2013/0294395 A1 Nov. 7, 2013

(30) Foreign Application Priority Data

Jan. 21, 2011 (FR) ...................................... 11 50507

(51) Int. Cl.
| | | |
|---|---|---|
| *H04W 4/00* | (2009.01) | |
| *H04W 60/00* | (2009.01) | |
| *H04W 12/08* | (2009.01) | |
| *H04W 84/08* | (2009.01) | |

(52) U.S. Cl.
CPC ............. *H04W 60/00* (2013.01); *H04W 12/08* (2013.01); *H04W 84/08* (2013.01)

(58) Field of Classification Search
CPC .... H04W 60/00; H04W 12/08; H04W 84/08
See application file for complete search history.

(56) References Cited

U.S. PATENT DOCUMENTS

| | | | |
|---|---|---|---|
| 2007/0037596 A1* | 2/2007 | Shaffer et al. | 455/518 |
| 2009/0150976 A1* | 6/2009 | Qian et al. | 726/3 |
| 2009/0285179 A1 | 11/2009 | Jones et al. | |
| 2010/0272031 A1 | 10/2010 | Grayson et al. | |
| 2013/0294395 A1* | 11/2013 | Pison | 370/329 |

FOREIGN PATENT DOCUMENTS

| | | |
|---|---|---|
| WO | WO 2010/113528 | 10/2010 |
| WO | WO 2010/122511 | 10/2010 |

OTHER PUBLICATIONS

International Search Report as issued for PCT/EP2011/068483.
(Continued)

*Primary Examiner* — Robert Wilson
(74) *Attorney, Agent, or Firm* — Pillsbury Winthrop Shaw Pittman LLP

(57) ABSTRACT

A method for attaching a user terminal to a packet network via a meshed radiocommunications network infrastructure includes selecting a host packet network dedicated to at least a category of users to which a user terminal belongs based on a second user identification code of the meshed network and/or access information pertaining to rights for attachment of user terminals to at least one packet network. The method finds an application in all types of infrastructure of meshed radiocommunications networks and finds a particularly interesting application in the case of PMR type professional radiocommunications networks.

12 Claims, 1 Drawing Sheet

(56) References Cited

OTHER PUBLICATIONS

LTE; General Packet Radio Service (GPRS) enhancements for Evolved Universal Terrestrial Radio Access Network (E-UTRAN) access (3GPP TS 23.401 version 8.7.0 Release 8), ETSI TS 123 401 V8.7.0, obtained via the 3GPP Organizational Partners' Publications Offices, Oct. 2009, 236 pages.

3rd Generation Partnership Project; Technical Specification Group Services and System Aspects; General Packet Radio Service (GPRS) enhancements for Evolved Universal Terrestrial Radio Access Network (E-UTRAN) access (Release 9), 3GPP TS 23.401 V9.4.0, obtained via the 3GPP Organizational Partners' Publications Offices, Mar. 2010, 258 pages.

* cited by examiner

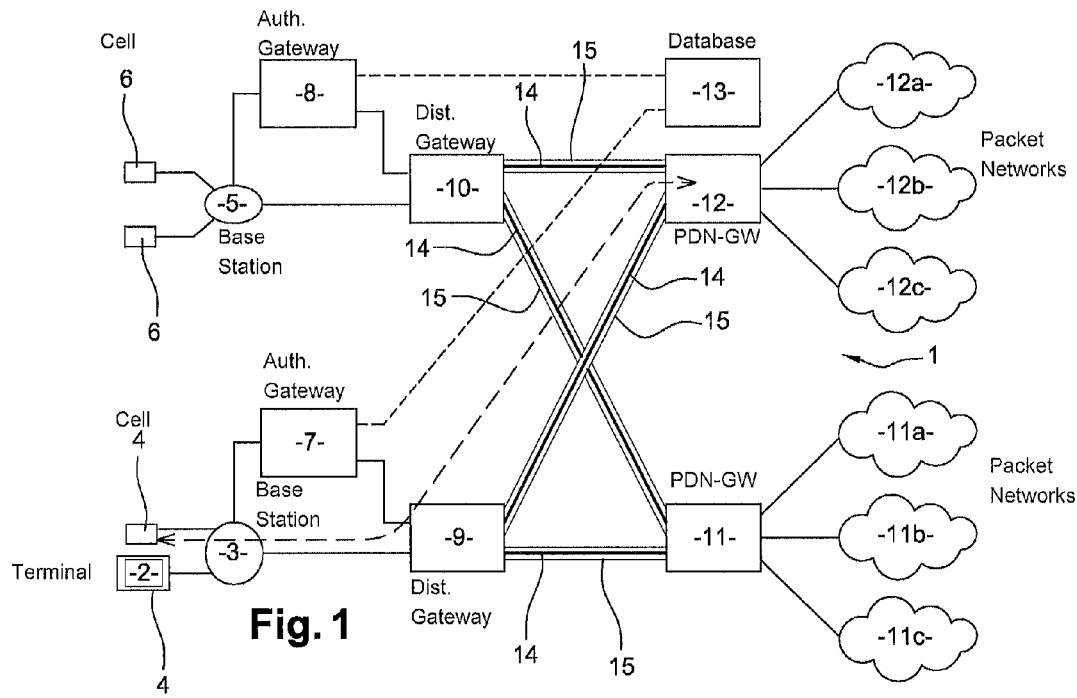
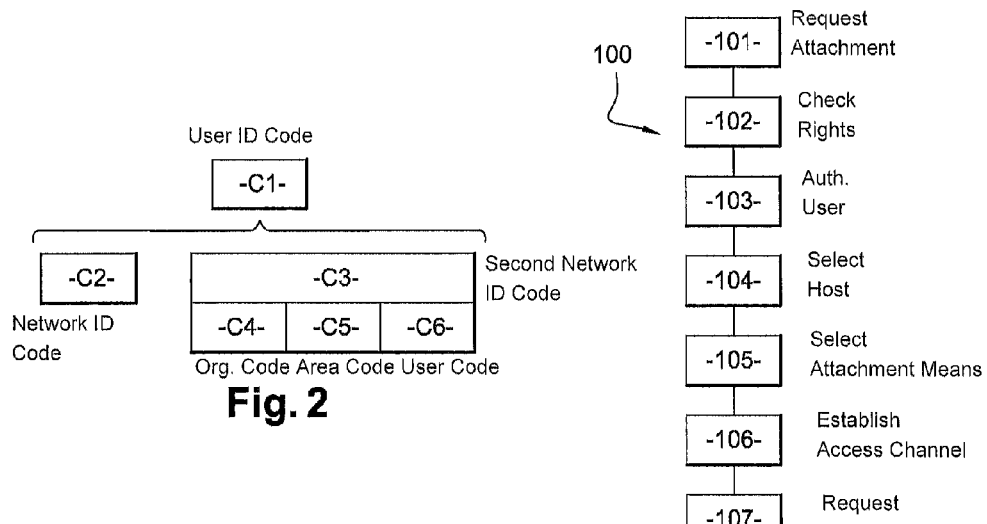
Fig. 1
Fig. 2
Fig. 3

METHOD FOR ATTACHING A USER TERMINAL TO A PACKET NETWORK

CROSS-REFERENCE TO RELATED APPLICATIONS

This is the U.S. National Stage of PCT/EP2011/068483, filed Oct. 21, 2011, which in turn claims priority to French Patent Application No. 1150507, filed Jan. 21, 2011, the entire contents of all applications are incorporated herein by reference in their entireties.

The present invention pertains to the telecommunication field and relates to a method for attaching a user terminal to a packet network via a meshed radio communication network infrastructure. The invention is interestingly applicable in the case of Professional Mobile Radiocommunications (PMR).

Currently, Professional Mobile Radiocommunications systems (called PMR systems) of TETRA type (for Trans European Trunked Radio) or TETRAPOL defined by the TETRAPOL industrial forum or even the P25 type defined by the "Telecommunications Industry Association (TIA)" for the "Association of Public-Safety Communications Officers (APCO)" are independent mobile communication networks dedicated to the usage of companies or administrations, in particular to ensure public safety, industrial safety or to intervene in transportation activities. PMR networks are widely used by the public safety services (police station and national police for example) and emergency and also by other categories of users (public transport, airports . . . ). They are private networks which have a high security level. The current PMR networks, based on the above-mentioned technologies, are called narrow-band networks characterized by a channel width of around a dozen kilohertz (kHz).

The progress of telecommunication networks and the rise of high speed prompt users of PMR systems to request more advanced applications requiring larger bandwidth. Hence, it is important to be able to make PMR systems progress towards higher speed broadband.

In the telecommunications field, there are high speed mobile public telecommunications networks, implementing a broadband technology (for example "Long Term Evolution", LTE, type) or "Worldwide Interoperability for Microwave Access" WiMAX type. The public networks offer the possibility for operators to serve a large part of a national or regional territory formed for example by the European territory.

Typically, this type of radiocommunications network comprises logical packet switching nodes coping with the transfer of data packets between network user terminals, data packets forming at least a packet network. In order to avoid a very high load at these logical packet switching nodes, the public mobile radiocommunications networks implement a load balancing method which involves load-balancing the data transfer channels between the different logical nodes comprising the network.

This load-balancing method presents has drawbacks particularly for the organizations ensuring public security services, for example the police station and the national police which generally use confidential data. In fact, the load-balancing method does not ensure a secured confidentiality of the data packets transmitted to the centre of the radio-communications network between the terminals belonging to a same organization ensuring public security services.

In this context, the invention aims to overcome the above-mentioned drawbacks.

To this end, the invention relates to a method for attaching a user terminal to a packet network via a meshed radiocommunications network infrastructure comprising:
- a plurality of base stations, each base station being capable of accomplishing radio transmission and reception with at least one user terminal located in at least one cell attached to said base station;
- a plurality of means for authenticating and monitoring user terminals;
- a plurality of means for attachment to packet networks;
- a plurality of distribution gateways, each distribution gateway being able to connect at least one of the base stations to at least attachment means;
- a database comprising access information pertaining to rights for attachment of user terminals to at least one packet network;

the user terminal having a unique user identification code comprising:
- a first meshed network identifier code, and
- a second meshed network user identification code, said method comprising the following steps in the meshed network infrastructure:
- receiving a request of a first attachment of a user terminal to a packet network, the request comprising the unique user identification code of the user terminal,
- checking the access rights of said user terminal to said infrastructure based on said first meshed network identifier code in the base station attached to the cell comprising the user terminal,
- authenticating the user of the user terminal based on the unique user identification code included in the database and in the user terminal;
- selecting a host packet network dedicated to at least a category of users to which the user terminal belongs based on the second meshed network user identification code and/or to access information pertaining to rights for the attachment of user terminals to at least one packet network;
- selecting of means for attachment to said host packet network based on data pertaining to the topology of the meshed network infrastructure,
- establishing an access channel between the means for attachment to the host packet network and a distribution gateway connected to the base station attached to the cell comprising the user terminal.

In the rest of the description, what is meant by "meshed network infrastructure" is a radiocommunications network infrastructure wherein each entity is connected to a plurality of infrastructure entities (or, even, to all entities, in this case it is a full meshed network infrastructure) this feature allowing the meshed network infrastructure to cover a large surface service area able to extend for example to the SURFACE of a country.

Thus, as will be seen in detail thereafter, the invention makes it possible to overcome the drawbacks related to the low security transfer of public service organization confidential data through high speed public telecommunication networks.

Thus, the invention makes it possible to manage attachments of terminals by category in a secure manner directly via the meshed network infrastructure using means for attachment to a packet network dedicated to one of the categories, considering that the same attachment means may be attached to several packet networks and thus to several categories. Consequently, thanks to the invention, a user terminal always communicates via a same packet network (its host or Home packet network) and thus, whatever its geographic position within the service area covered by the meshed radio communication network infrastructure.

The method according to the invention may also exhibit one or several of the features below, considered individually or according to all technically possible combinations.

In a non limitative embodiment, the selection of a host packet network is achieved according to access information pertaining to rights for attachment of user terminals to at least one packet network, said access information being formed by:
  the second meshed network user identification code, or
  a mask on said second meshed network user identification code, or
  a static IP address associated to said second code, or
  a mask on said IP address associated to said second code, or
  a realm IP address associated to said second code, or
  an "Access Point Name", APN, associated to said second code, or
  a priority of the user such as configured in the database for the unique identification code.

In a non limitative embodiment, the selection of a host packet network is achieved via the authentication and monitoring means or via the database.

In a non limitative embodiment, when the user terminal requires a communication, a data channel passing through the access channel is established.

In a non limitative embodiment, said second meshed network user identification code comprises:
  an identification code of a meshed network organization,
  an identification code of a meshed network service area, and
  a user identification code within the service area of the meshed network and of said organization.

In a non limitative embodiment, the category of users comprises an organization or an organization and a service area. What is meant by "organization" in the following description, is a structured assembly of people forming an association or an institution of common determined purposes.

In a non limitative embodiment, several identification codes of an organization are attached to a same packet network.

In a non limitative embodiment, said access channel is an S5 interface in accordance with a described behavior described in a mobile radiocommunications standard LTE.

In a non limitative embodiment, said meshed network infrastructure is in accordance with a mobile radiocommunications standard LTE,
  the attachment means being formed by a "Packet Data Network Gateway", PDN-GW entity,
  the packet networks being formed by a "Packet Data Network", PDN entity,
  the authentication and monitoring means being formed by a "Mobility Management Entity", MME entity,
  each of the distribution gateways being formed by a "Serving Gateway", SGW entity,
  each of the base stations being formed by a "evolved NodeB", eNodeB entity,
  the database being formed by a "Home Subscriber Server", HSS server.

In a non limitative embodiment, during the selection, primary means for attachment to the host packet network and secondary means for attachment to said host packet network are selected.

The invention also relates to a meshed radiocommunications network infrastructure comprising:
  a plurality of base stations capable of accomplishing radio transmission and reception with at least a user terminal located in at least one cell attached to one of the base stations;
  a plurality of distribution gateways, each distribution gateway being capable of accomplishing radio reception and transmission with at least one of the base stations;
  a plurality of means for attachment to at least one packet network;
  a plurality of packet networks;
  a plurality of means for authenticating and monitoring user terminals capable of authenticating the user terminals;
  a database comprising access information pertaining to rights for attachment of user terminals to at least one packet network. Said infrastructure is able to implement the method for attachment of a user terminal to a packet network of the invention according to any one of the preceding embodiments.

In a non limitative embodiment, each distribution gateway is connected to a plurality of attachment means by means of an access channel.

In a non limitative embodiment, said infrastructure is in accordance with a long range mobile radiocommunications standard of 3G, LTE or WiMAX type.

The invention also relates to a computer program comprising one or several instruction sequences that may be run by a data processing unit, the execution of said instruction sequences making it possible to implement a method for attaching a user terminal to a packet network of the invention according to any one of the previous embodiments, when loaded onto a computer.

Other features and advantages of the method according to the invention will become more apparent in the description given hereinafter, given for reference and in no way limitative purposes, with reference to the accompanying figures, wherein:

FIG. 1 represents according to a non limitative embodiment, a meshed radiocommunications network infrastructure according to the invention;

FIG. 2 illustrates a non limitative example of a unique user identification code;

FIG. 3 illustrates according to a non limitative embodiment a synoptic of the steps of the method according to the invention implemented in a meshed network infrastructure such as illustrated on FIG. 1.

For the sake of clarity, only the essential elements for understanding the invention have been represented in a schematic fashion, regardless to the scale.

FIG. 1 represents a radiocommunications meshed network infrastructure 1 according to the invention. As a purely illustrative purpose, the means described in this embodiment refer to the terminology used in an LTE type technology. It is obvious that the infrastructure of this network is in no way limited to such a radiocommunications standard and may apply to any type of packet mode broadband radiocommunications standard, for example the WIMAX technology.

Thus, in non limitative embodiments, the meshed network infrastructure 1 is in accordance with a long range mobile radiocommunications standard of 3G, LTE or WiMAX type.

It is worth noting that each user terminal which accesses the meshed radiocommunications network infrastructure 1, has its own unique user identification code (identifier) C1 (see FIG. 2), which unique identification code C1 comprises a first meshed network identifier code C2. This first meshed network identifier code C2 may be formed by a PLMNid type identifier.

The first meshed network identifier code C2 contained in the unique user identification code C1 allows the user terminal 2 to access a meshed network infrastructure 1 having the same meshed network identifier code. This advantageous effect will be described afterwards in more detail.

Furthermore, the unique user identification code C1 comprises a second meshed network user identification code C3.

In a first non limitative embodiment, this second meshed network user identification code C3 may be implemented in the form of three distinct codes a first one of which is dedicated to the service area, a second one is dedicated to the organization and a third one is dedicated to the user.

Thus, in a non limitative example, it may comprise:
- an identification code of an organization C4 (Organisation id, ORGiD) which may designate for example the police,
- a code for identifying a service area C5 (Regional Network id, RNiD) which may designate for example the French territory or the American territory, and
- a user identification code C6 within the service area of the meshed network infrastructure and organization.

In the example illustrated in FIG. 2, the identification code of an organization C4, the identification code of a service area C5 and the user identification code C6 are represented as being totally independent from each other. However, the latter may comprise common parts. By way of non limitative example, a same part of the second user identification code C3 may be used to form a part of the identification code of an organization C4, a part of the identification code of a service area C5 and/or a part of the user identification code C6.

The association of the identification code of an organization C4, of the identification code of a service area C5, and the user identification code C6 within the service area and the organization may be formed by an identifier of MSIN type.

Thus, the unique user identification code C1 is an association of the first PLMNid type meshed network identifier code C2 and the second MSIN type meshed network user identification code C3 and forms an IMSI type code.

Furthermore, in a second non limitative embodiment, the second meshed network user identification code C3 may be implemented in the form of numbering ranges, for example a first range of 0 to 1000 is dedicated to the French secret services (thus defining a service area which is France and an organization which deals with the secret services) and a second range from 1001 to 2000 is dedicated to French customs (thus, defining a service area which is France and an organization which deals with customs). Of course, a third embodiment may be implemented by combining a distinct code and a numbering range.

The meshed network radiocommunications infrastructure thus comprises:
- a plurality of base stations, each base station being able to accomplish the radio transmission and reception with at least one user terminal located in at least one cell attached to the base station;
- a plurality of means for authenticating and monitoring the user terminals;
- packet networks;
- a plurality of means for attachment to packet networks;
- a plurality of distribution gateways, each distribution gateway being able to connect at least one of the base stations to at least an attachment means;
- a database comprising access information pertaining to the rights for attachment of user terminals to at least one packet network;

It is worth noting that by packet network, is meant an IP (Internet Protocol) packet network which provides services such as for example a policeman having access to a missing persons file.

It is worth noting that a packet network of the infrastructure is dedicated to at least one category of users corresponding:
- to a specific organization such as for example the organization of firemen or police,
- to a specific service area such as for example the Yvelines or Hauts-de-Seine departments, or
- to a specific organization and to a specific service area such as for example firemen of the Yvelines department.

More particularly, the meshed network infrastructure 1 illustrated by way of non limitative example on FIG. 1 particularly comprises:
- a first base station 3 capable of accomplishing the radio transmission and reception with the user terminals 2 located in one of the cells 4 attached to the first base station 3;
- a second base station 5 capable of accomplishing the radio transmission and reception with the user terminals located in one of the cells 6 attached to the second base station 5; each of the first and second base stations 3 and 5 being formed by an eNodeB entity in LTE technology;
- first authentication and monitoring means 7 capable of authenticating user terminals, located in one of the cells 4 attached to the first base station 3;
- second authentication and monitoring means 8 capable of authenticating user terminals, located in one of the cells 6 attached to the second base station 5; each of the first and second authentication and monitoring means 7 and 8 being formed by an MME entity "Mobility management Entity" in LTE technology;
- a first distribution gateway 9 accomplishing the connection and the data transfer of user terminals 2 between the base station 3 and the attachments means 11, 12;
- a second distribution gateway 10 accomplishing the connection and data transfer of the user terminals 2 between the base station 5 and the attachment means 11, 12; each of the distribution, gateways 9 and 10 is for example a S-GW "Serving Gateway" entity in LTE technology;
- first attachment means 11 to at least a packet network 11a, 11b, 11c (typically an IP network);
- second means 12 for attachment to at least a packet network 12a, 12b, 12c (typically an IP network), each of the first and second attachment means 11 and 12 being formed by a "Packet Data Network Gateway", PDN-GW entity in LTE technology; the PDN-GW entity forms an anchor point towards the "Internet Protocol", IP network. It is worth noting that the first and second attachment means 11, 12 are equally called logical packet switching nodes. Furthermore, a packet network is formed by a "Packet Data Network", PDN entity in LTE technology;
- a database 13 comprising information pertaining to access rights of user terminals 2 to the meshed network infrastructure 1; the database 13 is for example an "Home Subscriber Server", an HSS server, in LTE technology.

In a particularly advantageous manner, the meshed network infrastructure 1 has a unique meshed network identification code able to be recognized by user terminals:
- belonging to different organizations,
- located in far away geographical areas covered by the service area of the meshed network infrastructure 1, or
- belonging to different organizations and further located in far away geographical areas covered by the service area of the meshed network infrastructure 1.

It is worth noting that the first attachment means 11 to a packet network are connected to the first distribution gateway 9 via an access channel 15 formed in a non limitative embodiment by a S5 type interface in LTE technology and to the second distribution gateway 10 via another access channel 15 also formed by another S5 type interface in LTE technology.

Likewise, the second attachment means 12 to a packet network are also connected to the first distribution gateway 9 and to the second distribution gateway 10 via access channels 15.

In a non limitative embodiment, the access channel 15 is established during a request of first attachment of a user terminal 2 to a packet network.

FIG. 3 illustrates the steps of a method 100 for attaching a user terminal to a packet network via the meshed radio-communications network infrastructure 1.

During a first step 101, a request of a first attachment of a user terminal 2 to a packet network 11a, 11b, 11c, 12a, 12b, 12c, is received, the request 101 comprising the unique user identification code C1 of the user terminal 2.

Thus, the user terminal 2 located in one of the cells 4 attached to the first base station 3 requires 101 a first attachment to one of the packet networks 11a, 11b, 11c, 12a, 12b or 12c by means of its unique user identification code C1. This request 101 is sent to the base station 3 attached to the cell 4 in which the user terminal 2 is located.

During a second step 102, the access rights of the user terminal 2 to the meshed network infrastructure 1 are checked. This checking 102 is carried out by means of the first meshed network identifier code C2 contained in code C1 of the user terminal and, on the other hand, memorized in the base station 3 attached to the cell 4 comprising the user terminal 2.

More particularly, if the first meshed network identifier code C2 held by the user terminal 2 is different from the identification code of the meshed network memorized in the base station 3 then the request 101 of the first attachment will either be rejected, or managed via roaming procedures if there are agreements with the meshed network and the network to which belongs the user terminal 2.

On the contrary, if the first meshed network identifier code C2 held by the user terminal 2 is identical to the identifier code of the meshed network of the base station 3, this signifies that the user terminal 2 belongs to one of the packet networks 11a, 11b, 11c, 12a, 12b or 12c of the meshed network. It will thus be accepted by the meshed network (infrastructure 1) but not yet authenticated.

In general it is up to the base station 3 to manage this monitoring 102.

During a third step 103, the user of the user terminal 2 requesting the first attachment is authenticated according to the unique identification code C1. During this authentication 103, the unique user identification code C1 comprised in the user terminal 2 and transmitted to the infrastructure 1 is compared to those comprised in the database 13.

Then, during a fourth step 104, a host packet network is selected, for example here the packet network 12a. The host packet network 12a is dedicated to at least a category of users to which the user terminal 2 belongs, this user category may correspond to:
- a specific organization such as for example the organization of firemen or police, or
- a specific service area such as for example the Yvelines or the Hauts-de-Seine department, or
- a specific organization and to a specific service area such as for example the firemen from the Yvelines department.

It is worth noting that several identification codes of an organization C4 may be attached to a same packet network 11a, 11b, 11c, 12a, 12b, or 12c. Thus, a same packet network 11a, 11b, 11c, 12a, 12b or 12c may be shared by different organizations such as for example the organization of the police and the organization of firemen.

This selection 104 is achieved according to the second meshed network user identification code C3 and/or to access information pertaining to attachment rights of user terminals to at least a packet network 11a, 11b, 11c, 12a, 12b or 12c. In non limitative embodiments, these access information may be formed by:
- the second meshed network user identification code C3,
- a mask on the second meshed network user identification code C3,
- a static IP address formed for example by the following code: 212.85.150.134, this IP address being associated to the second code C3 defining an organization, a service area or the association of a service area or an organization,
- a mask on the static IP address formed for example by the following code: 000.00.150.134, this mask on the IP address being associated to the second code C3 and defining an organization, a service area or the association of a service area and an organization,
- a realm IP address, particularly defined by the IP RFC 3103 standard, formed for example by: the realm IP address being associated to the second code C3 and defining in our example, the user "Robert" of the "Police" organization of the service area "of the Yvelines department",
- an "Access Point Name", APN, associated to the second code C3, or
- the priority of the user such as configured in the database 13 for the unique identification code C1. In other terms, during the first attachment of a user terminal, depending on its IMSI code and the priority level of its organization stored in the database 13, its host packet network may be determined.

Thus, at a priority level, a given host packet network is associated. By way of non limitative example, if the priority level is "2" for the firemen, it is associated with the host packet network of priority level 2 (which will thus be that of firemen), whereas if the priority level is "1" for the police, the host packet network of priority level 1 (which will be thus that of the police) is associated to it. It is of course worth noting that several of these embodiments may also be combined.

In a non limitative manner, this selection 104 of a host packet network may be achieved by the first authentication and monitoring means 7 or by the database 13.

Thereafter, during a fifth step 105, attachment means are selected (for example, the second attachment means 12) to the host packet network 12a selected during the fourth selection step 104.

This selection 105 of the second attachment means 12 to the host packet network 12a is achieved by the first authentication and monitoring means 7 communicating with the base station 3 attached to the cell 4 comprising the user terminal 2, this selection 105 being achieved according to the data pertaining to the topology of the meshed network infrastructure 1. The selection 105 may for example depend on the geographical localization of the organization to which the user terminal 2 belongs. Thus, if the meshed network infrastructure 1 covers the French territory and that the user terminal 2 is a part of the organization of firemen of the Yvelines department, the attachment means to a packet network which will be assigned to it will be preferably localized in the Yvelines department.

It is worth noting that the topology of the meshed network infrastructure 1 represents the interconnections between the different entities of the meshed network infrastructure 1, the entities being particularly the base stations, the means for authenticating and monitoring, the distribution gateways, the databases, the plurality of attachment means and the packet networks. Knowledge of the topology of the meshed network infrastructure 1 thus makes it particularly possible to know which attachment means are attached to the different packet networks.

During a sixth step 106, an access channel 15 is established between the second attachment means 12 to the host packet network 12a and the first distribution gateway 9 connected to the base station 3 attached to the cell 4 comprising the user terminal 2. It is worth noting that this sixth step 106 is also carried out according to the topology of the meshed network infrastructure 1 and is controlled by authentication and monitoring means 7.

This step 106 is achieved during a request of first attachment in accordance with a standard for establishing an access channel based on a temporary user identifier (more known under acronym T-IMSI, in LTE technology). Thus, the temporary access user identifier allows for an automatic routing towards the second means 12 for attachment to the host packet network 12a. As soon as the access channel 15 has been established between the first distribution gateway 9 communicating with the base station 3 attached to the cell 4 where the user terminal 2 is located and the second attachment means 12 to the host packet network 12a of the user terminal 2, the user terminal 2 may request a communication.

During a seventh step 107, during which the user terminal 2 requests a communication, a data channel 14 is established passing by the previously established access channel 15, the data channel 14 being established according to the requested service quality for the communication currently called QoS "Quality of Service", such as a determined bandwidth, a transmission lead time etc.

In the given example, the user terminal 2 is located in cell 4 at the time of communication request.

This data channel 14 passes by the access channel 15 (preferably formed by a S5 type interface in accordance with the LTE technology) connecting the second attachment means 12 to the host packet network 12a (which have been attributed to the first attachment) to the first distribution gateway 9 communicating with the base station 3 attached to the cell 4 where the user terminal 2 is located during the communication request. The procedure for establishing data channels 14 conforms to the 3GPP standard, such as described for example in the TS 23.401 specification and more particularly in chapters 4.3.2 Network access control functions, 4.3.8.1 PDN GW selection function (3GPP accesses) and 5.3.2 Attach procedure. The procedure for establishing data channels 14 will not be described in further detail here.

It is worth noting that an access channel S5 makes it possible to connect the attachment means 12 to the host packet network 12a to whichever the first or second distribution gateways 9, 10 of the meshed network infrastructure 1. Thus, one may use the second attachment means 12 to the host packet network 12a whatever the cell 4, 6 where the user terminal is 2.

Thus, if the user terminal 2 is located in the cell 6 during its communication request, the access channel 15 connecting the second attachment means 12 to the host packet network 12a and the second distribution gateway 10 will be used.

In other terms, whatever the cell where the user is, even though it is not a cell 4 attached to the base station 3 of the first attachment, the user terminal 2 will always use the same attachment means, here the second attachment means 12, to access its host packet network 12a. This makes it possible for the user terminal 2 to always access the services offered by the host packet network and thus whatever the geographical position of the user terminal in the coverage of the meshed network infrastructure 1.

Thus, the method 100 allows for the management of the attachments of terminals by category in a secure manner directly via the meshed network infrastructure 1 passing by attachment means to a packet network dedicated to one of the categories of users. As a packet network is dedicated to a category of users, the confidentiality of the information transmitted via the packet network is ensured.

The method implemented in the meshed network infrastructure makes it possible to secure the data for users belonging to a same user category from the data for other users of a different user category. For example, if the user category is a specific organization, data for users belonging to said specific organization can be secured from data for other users in the same service area but in another organization Furthermore, according to a non limitative embodiment of the method 100, during the selection step 105 of the attachment means to a packet network, primary attachment means to a host packet network (in a non limitative example, the primary means are formed by the second attachment means 12 to a host packet network 12a) are assigned and secondary attachment means to the host packet network 12a (in a non limitative example, the secondary means are formed by the first attachment means 11 to the packet network 12a) are assigned. Thus, if the primary means 12 are faulty, the user terminal 2 may still attach itself to the secondary means 11 to access its host packet network 12a.

It may be noted that the attribution method 100 has been described in a non limitative embodiment with a unique centralized database 13 communicating with the first and second authentication and monitoring means 7 and 8. Obviously, in another non limitative embodiment, a plurality of databases may be used, each of the databases communicating in this case with different authentication and monitoring means.

Furthermore, it is noteworthy that the meshed network infrastructure 1 may use several technologies, such as for example an LTE technology associated with a 3G, 2G or WiMAX technology. Furthermore, by way of a non limitative example, the meshed network infrastructure 1 may use a 3G technology coupled with a 2G technology.

It is noteworthy that when the meshed network infrastructure conforms to a WiMAX type technology, the database is formed by an AAA ("Authentification, Authorization and Accounting") entity.

Thus, the invention particularly presents the following advantages:

A unique meshed network identifier code of PLMNid type identifying the meshed network of the infrastructure is used to cover a service area of important surface area and a plurality of organizations. This unique identification code of PLMNid type allows for a user terminal to attach via its attachment means to its host packet network provided that the first user identification code has a meshed network identifier code identical to the meshed network identifier code of PLMNid type of the infrastructure comprising the attachment means.

In opposition to a LTE type general public network wherein the attachment of terminals by category to a packet network is not managed in the infrastructure but directly in an applicative manner in the packet network, the invention allows for managing terminal attachments by category in a secure manner directly via the meshed network infrastructure passing by means for attaching to a packet network dedicated to one of the categories.

Thus, the invention makes it possible to obtain a dedicated private network (transmission of data by category of user) without having the drawbacks (cost, set up and heavy management . . . ) by simply using a general public network which is widely deployed on a given territory.

The invention is also applicable to a computer program, particularly a computer program stored on or on a backup support that may be read by a computer and any data processing device, adapted to implement the invention. This program may use any programming language, and be in the form of source code, object code, or intermediate code between source code and object code such as in a partially compiled shape or in whatever other desirable form to implement the method according to the invention. The program may be downloaded in the base station via a communication network, like internet.

The storage support may be any entity or device capable of storing the program. For example, the support may comprise a storage means whereon the computer program according to the invention is stored, such as a ROM, for example a CD ROM or a microelectronic circuit ROM, or even a USB key, or a magnetic storage means, for example a floppy disk or a hard drive.

The invention finds an application in all types of infrastructure of radiocommunications meshed networks and finds a particularly interesting application in the case of professional radiocommunications networks of PMR type.

The invention claimed is:

1. A method for attaching a user terminal to a host packet data network via a meshed radiocommunications network infrastructure, said meshed radiocommunications network infrastructure comprising:
   a plurality of base stations, each base station being capable of accomplishing radio transmission and reception with at least one user terminal located in a cell attached to said base station;
   a plurality of entities for authenticating and monitoring user terminals;
   a plurality of entities for attachment to packet data networks;
   a plurality of distribution gateways, each distribution gateway being capable of connecting at least one of the base stations to at least one of the plurality of entities for attachment;
   a data base comprising access information pertaining to rights for attachment of user terminals to at least one of the packet data networks;
   wherein said method comprises:
   receiving a request of attachment of said user terminal to a packet data network, the request from said user terminal being received by a base station attached to a cell in which the user terminal is located, the request comprising a unique identification code comprising a meshed network identifier code and a user identification code,
   checking the access rights of said user terminal to said meshed radiocommunications network infrastructure by checking if the received meshed network identifier code is identical to a meshed network identifier code memorized in said base station,
   authenticating the user of the user terminal by comparing the received unique identification code to a unique identification code comprised in the data base;
   selecting said host packet data network dedicated to at least one category of users to which the user terminal belongs according to the received user identification code;
   selecting a first entity for attachment among the plurality of entities for attachment attached to said host packet data network based on data pertaining to a topology of the meshed radiocommunications network infrastructure representing interconnections in said meshed radiocommunications network infrastructure,
   establishing an access channel between the selected first entity for attachment and a distribution gateway connected to said base station, according to said data pertaining to the topology of the meshed network infrastructure.

2. The method according to claim 1, wherein the selection of the host packet data network is achieved by one of the entities for authentication and monitoring attached to said base station.

3. The method according to claim 1, further comprising: requesting by the user terminal of a communication and establishing a data channel passing by said access channel.

4. The method according to claim 1, wherein said user identification code comprises:
   an identification code of an organization,
   an identification code of a service area, and
   a user identification code within the service area and corresponding to said organization,
   said category of users corresponding to said identification code of said organization or to both said identification code of said organization and said identification code of said service area.

5. The method according to claim 4, wherein a plurality of identification codes of a plurality of organizations are attached, in the database, to a same packet data network among the plurality of packet data networks.

6. The method according to claim 1, further comprising selecting a second entity for attachment among the plurality of entities for attachment attached to said host packet data network able to access said host packet data network if the first selected entity for attachment is faulty.

7. Method according to claim 1, wherein each entity for attachment is a Packet Data Network Gateway entity, wherein each entity for authentication and monitoring is a Mobility Management entity, wherein each distribution gateway is a Serving Gateway entity, wherein each base station is a eNodeB entity, wherein the database is a Home Subscriber Server and wherein the meshed radiocommunications network infrastructure is a long range mobile radiocommunications infrastructure.

8. Method according to claim 1, wherein said selecting of said host packet data network dedicated to said category of users to which the user terminal belongs is performed according to the received user identification code and according to access information pertaining to rights for attachment.

9. Method according to claim 8, wherein access information pertaining to rights for attachment is formed by a priority of the user comprised in the database and associated with the unique identification code.

10. Method according to claim 8, wherein access information pertaining to rights for attachment is formed by a mask on the user identification code.

11. Method according to claim 8, wherein access information pertaining to rights for attachment is formed by the used identification code associated to:
   a static IP address of the terminal,
   a mask on a static IP address of the terminal,
   a realm IP address of the terminal user or
   an access point name of the terminal.

12. A non-transitory computer readable medium comprising one or several instruction sequences, the execution, by a processor, of said instruction sequences enabling the implementation of a method for attaching a user terminal to a host packet network packet data network comprising the following steps in a meshed radiocommunications network infrastructure:
   receiving a request of attachment of said user terminal to a packet data network, the request from said user terminal being received by a base station attached to a cell in which the user terminal is located, the request comprising a unique identification code comprising a meshed network identifier code and a user identification code,
   checking the access rights of said user terminal to said meshed radiocommunications network infrastructure by checking if the received meshed network identifier code is identical to a meshed network identifier code memorized in said base station,
   authenticating the user of the user terminal by comparing the received unique identification code to a unique identification code comprised in the database;
   selecting said host packet data network dedicated to at least one category of users to which the user terminal belongs according to the received user identification code;
   selecting one of the plurality of entities for attachment attached to said host packet data network based on data pertaining to a topology of the meshed radiocommunications network infrastructure representing interconnections in said meshed radiocommunications network infrastructure,
   establishing an access channel between the selected entity for attachment a distribution gateway connected to said base station, according to said data pertaining to the topology of the meshed network infrastructure.

* * * * *